Jan. 31, 1967     D. VICINI     3,300,813
ATTACHMENT FOR FOOTWEAR MOLDING MACHINES
Filed April 6, 1964     4 Sheets-Sheet 1

INVENTOR.
Dino VICINI
BY
Agent

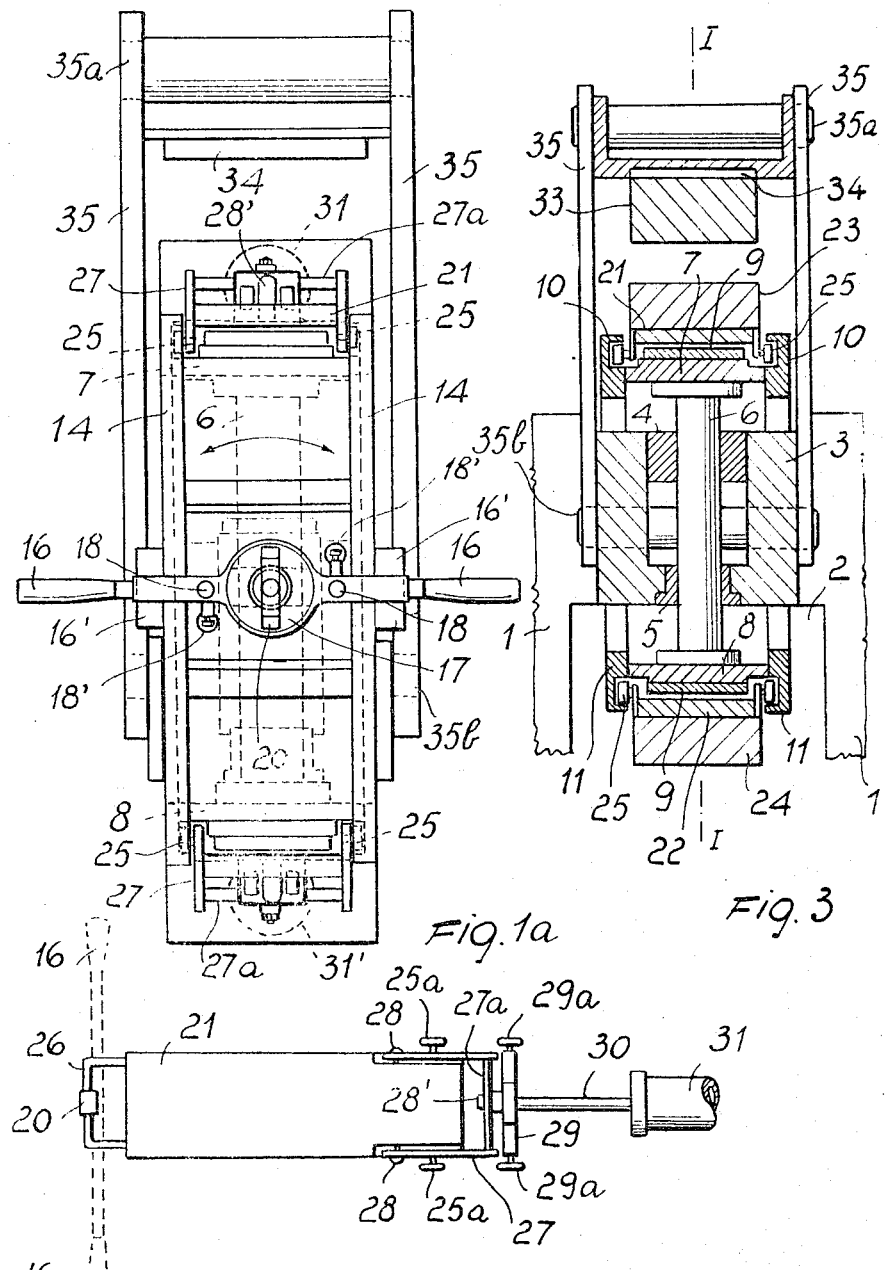

Jan. 31, 1967  D. VICINI  3,300,813
ATTACHMENT FOR FOOTWEAR MOLDING MACHINES
Filed April 6, 1964  4 Sheets-Sheet 3

INVENTOR.
Dino VICINI
BY
Agent

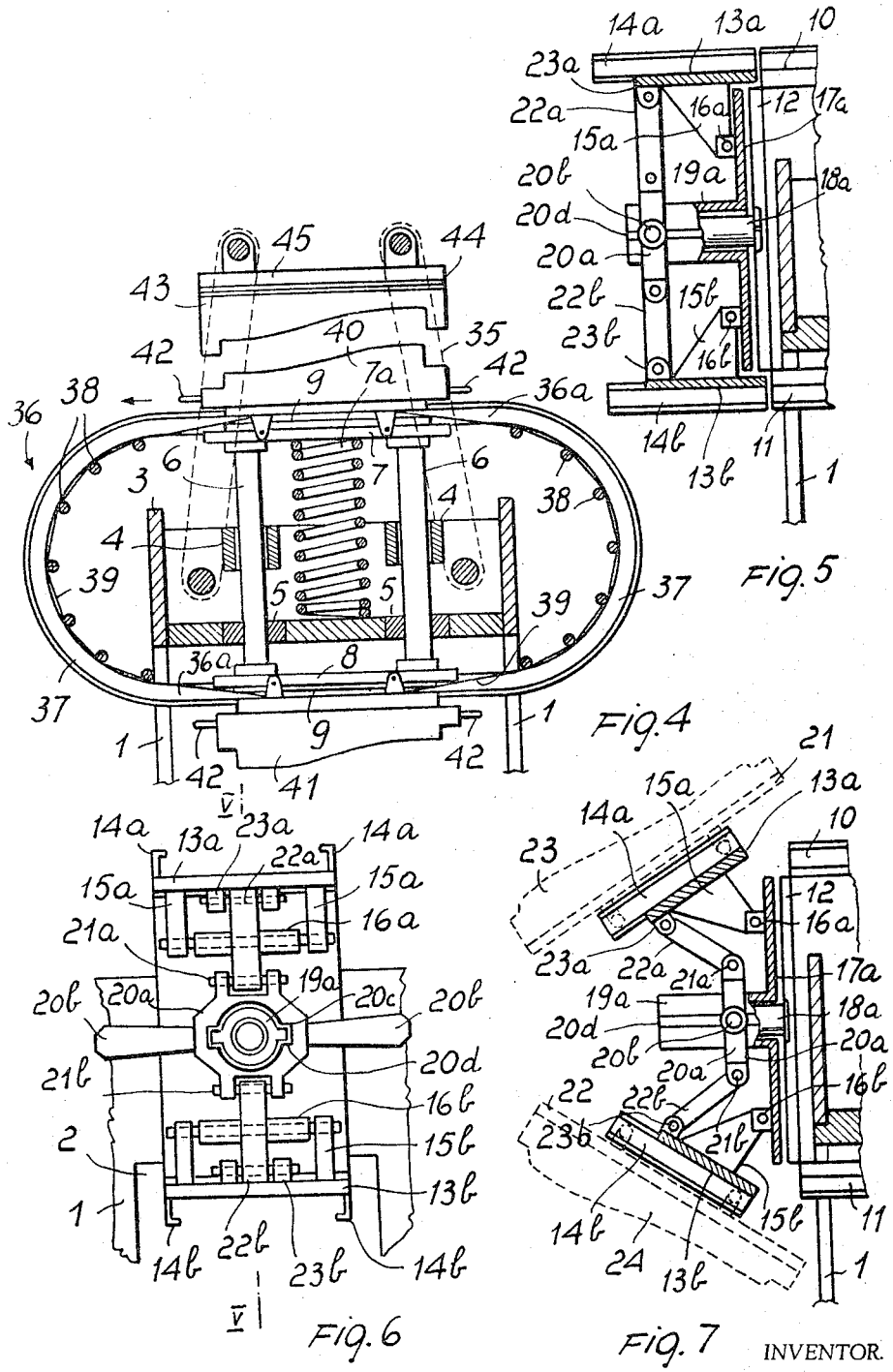

United States Patent Office 3,300,813
Patented Jan. 31, 1967

3,300,813
ATTACHMENT FOR FOOTWARE MOLDING MACHINES
Dino Vicini, Via Filippo Carcano, Milan, Italy
Filed Apr. 6, 1964, Ser. No. 357,834
Claims priority, application Italy, Apr. 12, 1963,
33,964/63; Aug. 7, 1963, 37,980/63
5 Claims. (Cl. 18—17)

This invention relates to an attachment for molding machines producing articles of rubber, natural and synthetic resins, and more particularly to automatic presses for molding of boots or footwear with short or long bootlegs in one or more colors, said attachment being provided for pre-molding and pre-vulcanization of the shoe sole.

The process of pre-molding and pre-vulcanization of portions of molded products by means of automatic presses is known and consists in pre-vulcanizing a portion of said products simultaneously with the final molding operation.

It is an object of this invention to provide a pre-molding attachment of safe performance, easy maintenance and adapted for an extremely accurate and almost automatic operation.

It is another object of this invention to reduce the dangers and the fatigue of the operator by cutting further working times down.

It is still a further object of this invention to ensure the use of two or more sole molds identical with each other, having each one single sole die, i.e. molds of easy construction and good precision.

It is still another object of this invention to make it possible that the movable parts of the attachment are disposed during the rest stage in a very comfortable position so as to ease appreciable control, burring and loading operations of the sole molds thus avoiding possible imperfections or workmanship defects.

It is another object of this invention to ensure an excellent control of temperature over all parts of the molding equipment.

These and still other objects are attained by the attachment according to this invention for pre-molding of a portion of natural resin or synthetic resin products such as boots and footwear in general in one or more colors, which attachment is characterized by including at least two movable dies arranged on respective carriages, mounted slidable over guides which are in turn associated with members, mounted displaceable in a preferably vertical direction, at least one counter-die provided fixed and cooperating at successive times with said movable dies for pre-molding of a portion of the product under process, simultaneously with the final molding of the item itself, said guides being composed of at least two preferably substantially parallel, opposite first sections and of other sections adapted to ensure the displacement of said dies out of the plane defined by said first sections, means being provided for displacing said dies from the working position to the rest position and inversely on said guides.

Further characteristics and advantages of the invention will become more apparent from the detailed description of two preferred but non-limiting embodiments of a pre-molding attachment taken in conjunction with the accompanying drawing, in which:

FIG. 1a is a front view of the rotating part of the device of FIG. 1;

FIG. 3 is a cross section according to line III—III of FIG. 1, shownig the same pre-molding attachment in the lowered position with molds opened;

FIG. 3a is a diagrammatic plan view of a carriage on the relevant moving means.

FIG. 4 illustrates in a schematical longitudinal median section and in a slightly reduced scale with respect to FIG. 1 is a pre-molding attachment according to a second embodiment, fitted to the framework of the molding machine;

FIGS. 5 and 6 show a section according to line V—V of FIG. 6 and a front view respectively of the carriage exchange assembly according to a modified embodiment;

FIG. 7 shows a section according to line V—V of FIG. 5, of the assembly shown in FIGS. 5 and 6 in the exchange position thereof.

Figure 1:
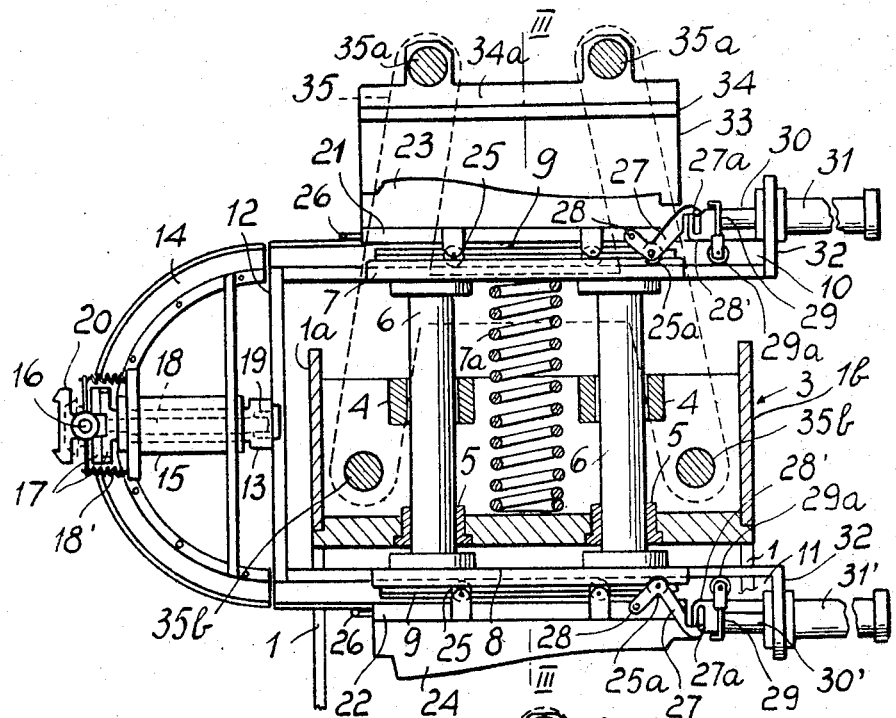
FIG. 1 is a longitudinal section according to line I—I of FIG. 3 showing the pre-molding attachment according to the first embodiment in elevated position (molds closed), fitted to the framework of a molding machine.

Referring now to FIGS. 1 to 3d, the pre-molding attachment is fitted (FIGS. 3b, 3c, 3d) the framework 1 of a molding machine for boots and the like of the type performing an upward movement of the mold holding set for the bootlegs at the center line of the window 2 by means of a bridge 3 (with U-shaped section), fastened to the front and rear plates 1a and 1b, respectively, of the framework. Said bridge 3 is provided with bushes 4 and 5, adapted to ensure vertical sliding of the columns 6, fast with plates 7 and 8 both plates being provided with heating elements 9, preferably of the resistor type. With the bridge 3 there is associated a lightning spring 7a pushing upwardly the plate 7, to facilitate the vertical displacements of the members 6, 7 and 8.

The plates 7 and 8 support further two side guides comprising two rectilinear track sections 10, fastened to the plate 7 and two track sections 11, identical with the preceding ones, fastened to the plate 8, sections 10 and 11 being parallel to each other (FIG. 3).

Towards the front side of the machine said guides 10 and 11 are fastened to a substantially quadrangular plate 12 to the center of which a horizontal pin 13 is fixed by welding on which there is rotatorily mounted the remaining part of the track system constituted of two parallel track sections 14 having the shape of a half-circle and disposed each in the rest condition thereof in vertical planes containing also the track sections 10 and 11 so as to constitute extensions thereof. The curved track sections 14 of the guide system constitute a frame rotatable around pin 13, the latter being rotatorily engaged with a sleeve 15, fast with the aforesaid track sections 14.

The rotation of the arcuated sections 14 may take place by operating on the control levers 16 after disconnecting however a locking system comprising the coupling cams 17 and the two locking rods 18 disposed symmetrically sideways of sleeve 15 (FIG. 1 and 1a). The rods 18 engage with an end thereof in bushes 19, fast with the plate 12 and are connected at the other end thereof with the handles 16. Rigid with the latter is also a double hook 20, the function of which will be explained later, whilst spring-loaded means 18' tending to keep rods 18 inserted in bushings 9 are provided.

Handles 16 are also engaged with the curved track sections 14 through forks 16' (FIG. 1a) fixed on said track sections 14 so that the arms of the handles may slide within forks 16' without the possibility to egress therefrom.

Guides or tracks 10, 11, 14 serve to permit the displacement of carriages 21, 22 carrying the dies 23 and 24, respectively which are identical with each other. To this end, said carriages 21 and 22 are provided with idle wheels 25 housed in special grooves provided in said guides. Said grooves have each two opposite guide surface adapted to guide alternatively the wheels 25 also in the overturned position of the turnable framework.

On the front side the carriages 21 and 22 are provided with U-handle-shaped members 26, whilst on the rear side there are provided movable member 27, these too having substantially a U-handle-shaped configuration with the opposite arms in the form of an elbow lever, and are hinged in 28 to the carriages and are provided with wheels 25a sliding in the guide grooves. The pins 27a of said member 27 engage with the hooks 28', associated with the movable plate members 29 (provided in turn with wheels 29a sliding in the guide grooves).

Such movable plate members 29 are fast with the stems 30, 30' of the hydraulic cylinders 31 and 31' fastened at one end thereof by means of connecting plates 32 to the guides 10 and 11.

Figure 2:
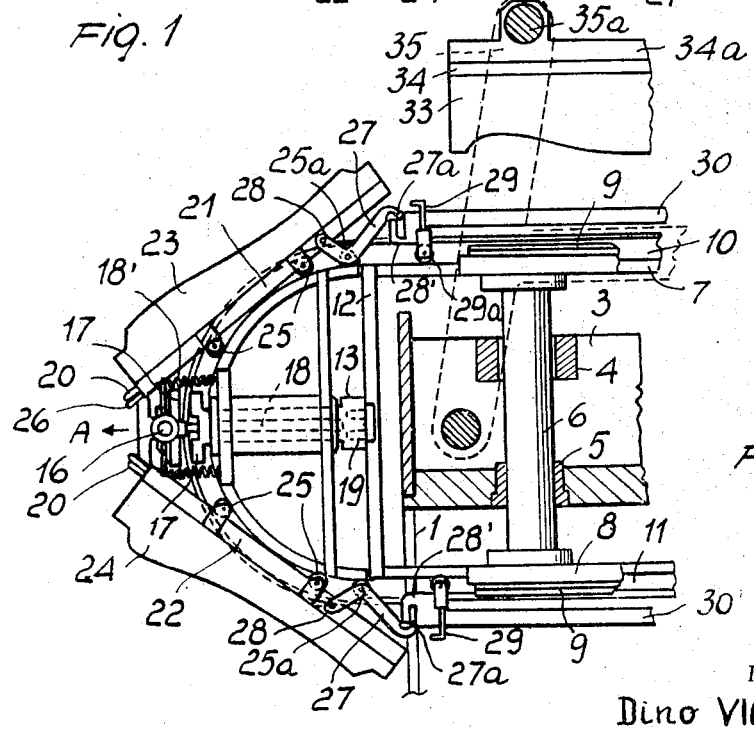
FIG. 2 shows the longitudinal section of the attachment shown in FIG. 1, in the lowered position with molds in rest stage position.

The attachment is completed with a fixed counter-die 33, provided with heating elements 34 preferably of the resistor type, sustained by the plate 34a, connected through cross-pins 35a to the support members 35 having substantially a H-shaped configuration and indicated with brocked lines in FIG. 1 and 2; the latter members are fastened to the carrying structure of the machine by means of cross pins 35 connected with pin 3.

Figure 3B:
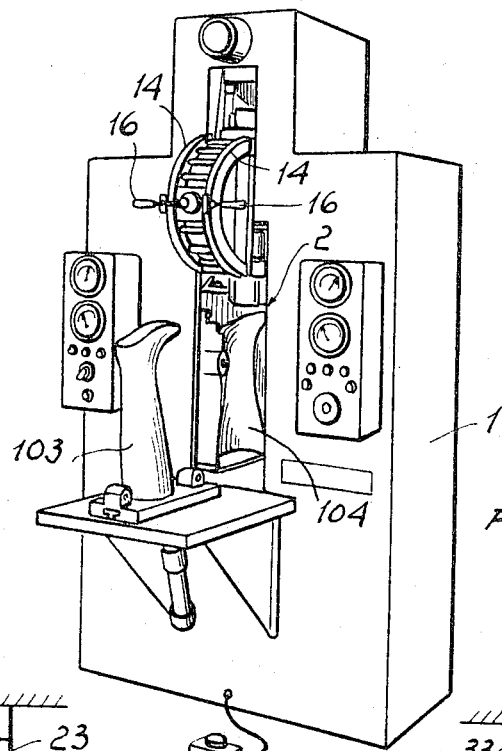
FIG. 3b is a general perspective showing, in reduced scale a molding machine for boots and similar provided with the attachment shown in the preceding figures.
Figure 3D:
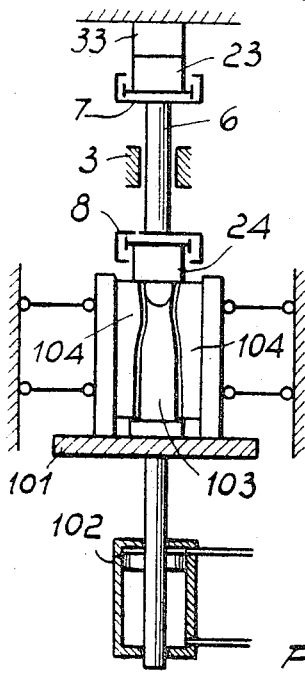
FIGS. 3c and 3d show diagrammatically a molding machine provided with the attachment according to the invention in the idle and operating position, respectively.
Figure 3C:
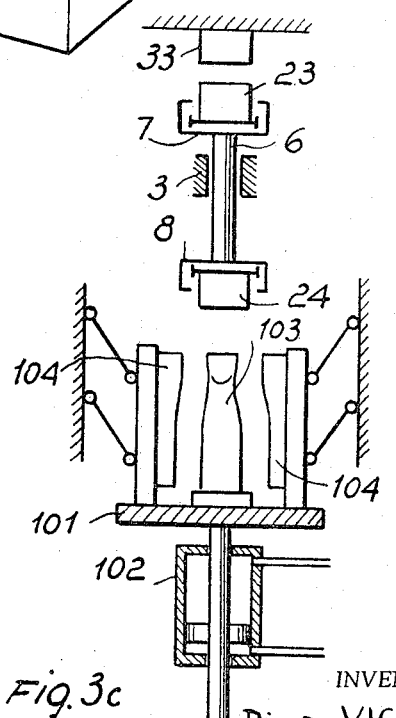

The operation of the attachment is as follows:

As clearly illustrated in the diagrammatical FIGURES 3c and 3d, the attachment according to the invention starts to operate simultaneously with the other parts of the molding machine. The latter is provided with a movable plate 101 rigidly connected with the stem of a hydraulic double acting cylinder 102 capable to upwardly displace the said plate 101.

On said plate the last 103 of the footwear is arranged whereon rubber or other similar material is slipped over in a suitable manner, while at the sides of such last two half molds 104 are arranged, which are connected with the stationary structure through a linkwork. It will be understood that the last 103 and the half molds 104 act as a counter-die cooperating with the die 23 or 24.

When the last 103 is lifted the half molds 104 are approached sidewise to the same, while sliding over the plate 101 and, in the last stage of the lifting movement they engage with the die 24. The latter is thus lifted together with the opposite die 23, which in turn is pressed against the fixed die 33. In this way the attachment passes from the position shown in FIG. 3c to that of FIG. 3d and in this latter position the dies 23 and 24 enter into action.

More precisely, with the die 23 (previously charged with the crude material) and with the counter-die 33 the pre-vulcanization of a sole is obtained, while the die 24 (which carries a sole which was already pre-vulcanized in the previous cycle) cooperates with the last 103 and the half-molds 104 for the final molding of the boot or similar footwear.

Once the preset closing time of the molds has been completed, the movable parts of 6, 7, 8, 10, 11, 12, 13, 14, etc., the attachment are lowered and the molds 104 open as a consequence of the lowering of the plate 101 (FIG. 3c) (the attachment assumes the position of FIG. 3).

At this stage the hydraulic cylinders 31 and 31' enter into function (automatically or by actuation of controlling push buttons) which with the extension of the respective stems 30 and 30' cause the forward motion of the carriages 21 and 22, until the same reach the rest position (FIG. 2).

In FIG. 2 may be seen that, when the carriages 21 and 22 reach the arcuated track-sections, the members 27 displace with respect to said carriages 21 and 22 because of the provision of hinges 28 on the carriages themselves and the engagement of the wheels 25a with the guide grooves of the track sections.

In such a way the pins 27a of members 27 are held in engagement with the hooks 28', associated with the stems 30 and 30' also when the carriage is on the arcuated track-section.

At this stage the dies 23 and 24, begin in a comfortable position before the operator, may be easily controlled and the pre-vulcanized sole on the die 23, may be if necessary burred off without any difficulty.

Subsequently there is the exchange of the movable dies 23 and 24 by rotating around pin 13 the movable frame comprising the arcuated track-sections 14 of the guides. In order to do this the operator draws in direction of arrow A (FIG. 2) the handles 16 so as to disconnect the cams 17 from each other and side pins 18 from bushings 19; simultaneously, the double hook 20 engages with handles 26 projecting from the carriages locking them in the position shown in FIG. 2. This small displacement executed by acting on handles 16 occurs against the action of spring means 18', so that in order to make this position stable it will just suffice to proceed with rotation of the movable frame; rotating, in fact, the latter by again acting on handles 16 the engagement between the cams 17 works to the effect of keeping in the outward position the double hook 20 (and with it the rods 18 and the handles 16) until the guides 14 are overturned. The rotatioin of the latter is due also to the engagement of the arms of the handles 16 with the forks 16' (FIG. 1a) which are rigid with the said guides.

Once this position is reached with a 180° rotation the cams 17 are again inserted in each other due to action of the spring-loaded means, the rods 18 penetrate again in the bushes 19 and the double hook 20 releases the levers 26. During the rotation of the arcuated guides 14 occurs further the disengagement of pins 27a of members 27 from hooks 28', simply due to the rotation itself and in the same manner after reaching the overturned position the pins 27a return to engage with hooks 28' in an exchanged position.

In fact, the pins 27a of the members 27 are in engagement with the hooks 28' up to the moment in which the carriages 21 and 22 are caused to rotate together with the arcuated track sections 14; at the beginning and at the end of the 180° rotation there occurs the disena modified embodiment is provided which make it possitions between the pins 27a and the hooks 28' (FIG. 3a).

After the die 24 (previously brought upwardly by the overturning of the movable frame) is loaded in known manner with crude rubber, the cylinders 31 and 31' are actuated to bring back the carriages 21 and 22 on the horizontal track sections 10 and 11. There occurs then the closing of the molds 104 during which in the die 24 there occurs the pre-molding of a sole and on the lower part (by means of die 23) final molding of a boot or the like.

The various working stages follow one another in a closely analogous manner to that described above.

As it may be observed, the manual intervention is considerably reduced as compared to the working systems now in use and can be still reduced by providing according to a modified embodiment a servomechanism, adapted to automatically rotate the movable frame comprising the curved track-sections 14 of the guides.

For this purpose for the carriage exchange assembly, a modified embodiment is provided which makes it possible to avoid the arcuated track-sections.

In fact, as illustrated in FIGS. 5, 6, 7 relating to the front part of the attachment, the arcuated track-sections 14 of the guides are replaced by rectilinear track sections 14a and 14b mounted on plates 13a and 13b, respectively, which are provided in turn with arms 15a and 15b, hinged in 16a and 16b on the turnable plate 17a. The latter faces the fixed plate 12 and may rotate around the pin 18a, fixed on the plate 12; in fact, the turning plate 17a is associated with a bush 19a rotatorily mounted on said pin 18a. On the bush 19a is mounted a longitudinally sliding sleeve 20a, provided with handles 20b and internal grooves 20c in slidable engagement with the corresponding guiding ribs 20d laterally provided on the bush 19a.

The sleeve 20a has two fork like lugs 21a and 21b, one above and the other under, to which one end of connecting rods 22a and 22b are hinged respectively, the other end of which being hinged to the respective fork like lugs 23a and 23b, fast with plates 13a and 13b, respectively.

The operation of the exchange assembly illustrated in FIGS. 5, 6 and 7 is apparent from the same figures.

When the stems 30 and 30' of the hydraulic cylinders 31 and 31' have led the carriages 21 and 22 on the track sections 14a and 14b it is possible to proceed with the carriage exchange similarly to what is described in the preceding paragraphs. By acting, in fact, on the handles 20b to the effect of pushing them towards the plate 17a the sleeve 20a is displaced and by virtue of the lever and linkage system associated with it the plates 13a and 13b rotate around the fulcrum pins 16a and 16b, respectively.

The position shown in FIG. 7 is thus reached, that is to say, the carriages 21 and 22 are caused to assume a tilted position like that represented in FIG. 2. Obviously, the carriages 21 and 22 are maintained in position on the guides 14a and 14b by means of suitable stops not shown in the figures.

The rotation of the plate 17a and hence the exchange of the dies 23 and 24 occurs still by acting on the handles 20b by causing through the engagement of the guide ribs 20d with the grooves 20c the rotation of the bush 19a around the pin 18a.

The guides 14a and 14b may be again brought back in the horizontal position by pulling forward the handles 20b and moving them away from the plate 17a until reaching the position shown in FIG. 1 (suitable stopping, locking and unlocking systems are provided, not shown in the figures, to limit the travel of the sleeve 20a as well as to associate and release the carriages 21 and 22 from the hook means shown by the stems of the working cylinders, similarly to what described with reference to FIGS. 1 to 3d).

In FIG. 4 there is illustrated a longitudinal section of the pre-molding attachment according to a second embodiment.

Referring now to FIG. 4, in which the members equal to those given for the first embodiment have been indicated with the same reference numbers, the pre-molding attachment is fitted to the framework 1 of a molding machine for boots and the like with an equipment analogous to the one formely described, comprising the columns 6, fastened to the plates 7 and 8 with which plates two equal side guides or track 36 are fast. Each of such guides or the track is endless i.e. substantially of annular form with two opposite track sections 36a running parallel, rectilinear and horizontal to each other, such track sections 36a being connected to each other by two half-circular track sections 37.

The connection between the guides 36 is further consolidated by means of stiffering cross pieces 38 arranged at the arcuated track sections 37 and provided at their ends with slide pulleys. On such pulleys are caused, to pass metal cables 39, connecting to each other the movable dies 40 and 41, which similarly to what described formerly, may slide over the guides 36 by means of idle wheels provided by the respective carriages. In such a manner, by displacing one of the two dies 40 or 41 simultaneously the other die is displaced. The dies 40 and 41 may be manually displaced by means of the handgrips 42. An automatically driven movement by means of suitable servocontrols is also foreseen.

The attachment, completed with a fixed counter-die 43, is provided with heating means preferably of the resistor type 44 and supported by a plate 45, which is in turn supported by two substantially H-shaped side members 35, analogous to that of the embodiment shown in FIGS. 1–3d. The operation of the attachment is similar to that of the first embodiment.

In closing position (or working position) of the molds, that is with the die 40 in contact with the counter-die 43, the attachment allows the pre-molding of the sole (with the die 40) and the simultaneous final molding of a boot (with the die 41 cooperating with the remaining parts of the mold for the bootleg or the like).

When the closing time period of the molds is over, the movable parts of the attachment (as shown in FIG. 4) are lowered and the molds are opened.

The die 40 capable to run on the track is then manually or automatically drawn to the front side of the machine in an approximately vertical position and consequently also the die 41 reaches simultaneously the opposite vertical position. In such a position the control of the pre-vulcanized sole and the eventual burring are carried out. This accomplished, the same die 40 is displaced in the lower position (position formerly taken by die 41) where it is ready to cooperate with the remaining parts of the mold for the final molding of a boot or the like.

The movement go then through in a closely analogous manner by gradually displacing the dies 40 and 41 in such a way that they are in opposite positions and become repeatedly exchanged with respect to the fixed counter-dies (this is put into effect by means of the flexible connections 39 and the closed annular path provided by the guides 36).

The invention as devised is subject to several changes and modifications all falling within the scope of the invention. So for example displacements in vertical directions of the attachment may occur in opposite directions to those described above. Said vertical displacements may be further imparted by independent control means disposed in the highest part of the machine, so that the attachment may be also mounted to automattic or half-automatic molding machines with the closing motion of half-molds for boots or the like performed only in horizontal direction.

In practice, any material and dimensions whatever could be used depending upon requirements and further all elements could be replaced with other technically equivalent members.

I claim:

1. An attachment for molding machines of the type described, comprising a stationary frame and a movable frame in said molding machine, a track having a first track section on said movable frame, a second track section on said movable frame, parallel with and in opposite position to said first track section, at least a third track section on said movable frame, said third track section having means for connecting said first track section with said second track section through said third track section, two die supporting carriages movable on said track and in opposite position thereto, each of said carriages having a die fixed thereon, two counter-dies cooperating with said dies, one of said counter-dies being a stationary counter-die supported on said stationary frame, the other of said counter-dies being movable in the direction towards and away from said one of said counter-dies and arranged in opposite position to and at a distance from said one of said counter-dies thereby allowing said movable frame with the die supporting carriages thereon to be arranged between said two counter-dies, lock means to releasably lock said carriages in opposite positions on said track and in front of said counter-dies, means for moving said carriages on said track, means for moving said other of said counter-dies and therethrough said movable frame when said carriages are in position on said track towards an engaging position of said dies with said counter-dies.

2. A device according to claim 1, wherein said other of said counter-dies is rigidly connected with said means for moving said other said counter-dies.

3. A device according to claim 1, wherein said first, said second, and said third track sections are rigidly connected with each other and said track has an endless annular extension.

4. A device according to claim 1, wherein said third track section has rotatory supporting means allowing rotation of said third track section with respect to said first and second track sections.

5. A device according to claim 1, wherein said first and said second track sections have a common axis of symmetry and said third track section is symmetrical with respect to said axis of symmetry and has rotatory supporting means with an axis of rotation coinciding with said axis of symmetry.

References Cited by the Examiner
UNITED STATES PATENTS 2,428,878   10/1947   Johnson _____ 25—100 X
3,189,943   6/1965   Choice et al. _____ 18—17

J. SPENCER OVERHOLSER, *Primary Examiner.*

E. MAR, *Assistant Examiner.*